Dec. 31, 1968 I. F. BARDITCH ETAL 3,419,812
BANDPASS AMPLIFIER
Filed Sept. 2, 1966
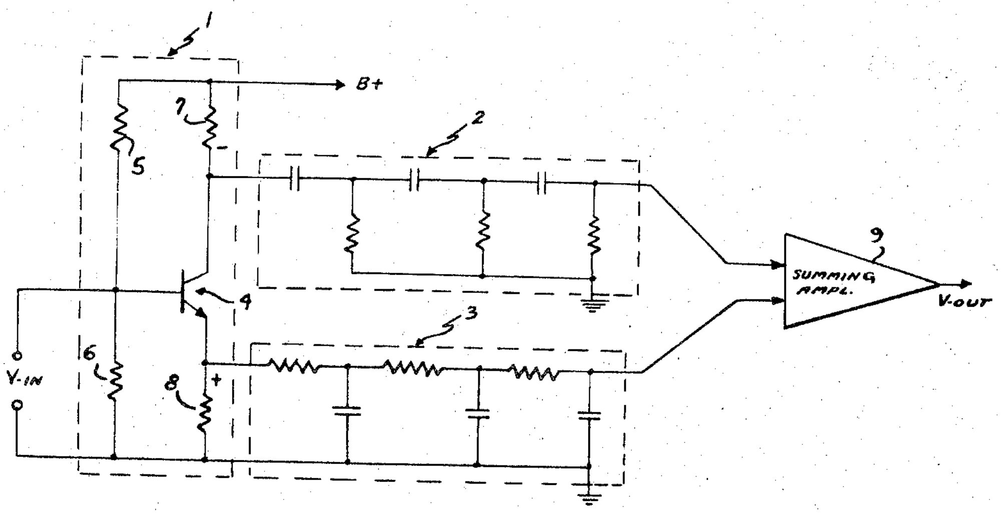
INVENTORS
IRVING F. BARDITCH
& CHARLES G. BROOKS
BY
John P. O'Brien
AGENT United States Patent Office 3,419,812
Patented Dec. 31, 1968

3,419,812
BANDPASS AMPLIFIER
Irving F. Barditch and Charles G. Brooks, Baltimore, Md., assignors, by mesne assignments, to the United States of America as represented by the Secretary of the Air Force
Filed Sept. 2, 1966, Ser. No. 577,101
2 Claims. (Cl. 330—30)

ABSTRACT OF THE DISCLOSURE

An amplifier having a bandpass characteristic is provided by dividing the input signal in the amplifier into two equal components 180 degrees out of phase, passing one component through a passive high pass filter, the other component through a passive low pass filter, and then vectorially adding the outputs of the filters.

In the past, various techniques have been investigated in an attempt to develop a successful bandpass amplifier not requiring the use of inductance. There are several reasons for wanting to eliminate the need for inductance. Inductance coils are relatively heavy and expensive. Also, a bandpass amplifier with no inductance is ideal for use in an integrated type circuit since resistance and capacitance can be easily built into an integrated circuit. This invention has overcome the objectionable use of inductance by employing only resistance and capacitance elements in the design of a bandpass amplifier.

Briefly, this invention consists of the following. A paraphase amplifier drives a passive low pass and passive high pass R-C network. For a particular selected frequency the output signals of the two networks will be in phase. The two output signals are combined in a summing amplifier. The resultant output is a bandpass waveform which peaks at the selected frequency.

The invention together with its principle of operation and mode of construction may be apprehended by reference to the following description, considered in connection with the drawing wherein:

The drawing shows a circuit diagram of bandpass amplifier embodying this invention.

This invention is based upon the discovery that by arranging a low pass and a high pass R-C network in a particular manner and summing the output voltage of the two networks, a bandpass circuit results. The novel arrangement was discovered by utilizing the unique electrical characteristics of R-C networks, as will now be explained.

R-C networks shift the phase of signals fed into them and attenuate the amplitude of signals. Low pass R-C networks cause a phase lag and high pass R-C networks cause a phase lead of their output voltages with respect to their input voltages. If a low pass and high pass R-C network are driven by the same voltage, the output voltage of the two R-C networks will be 180° out of phase with each other at some given frequency $f_1$, as determined by the R-C time constant of the two networks.

The operation of this invention is based upon the above well known principles of R-C networks. By splitting the input voltage into two components that are in phase opposition and applying one component to a low pass R-C network and the other component to a high pass R-C network, the output voltage of the two R-C networks will be in phase with each other for some frequency $f_1$. If the two output signals are then combined in a summing amplifier, the resulting voltage will be the sum of the two since they are in phase. Thus, by arranging a high pass and low pass R-C network in the suggested manner, a bandpass network results which peaks at a frequency $f_1$.

Referring to the drawing, there is shown paraphase amplifier 1 feeding a push-pull output stage consisting of high pass network 2 and low pass network 3. Transistor 4 is connected to the B+ terminal of a power supply through resistor 5. Resistor 6 establishes the D-C operating voltage. The output current of transistor 4 flows through collector load resistor 7 and emitter load resistor 8.

Paraphase amplifier 1 operates in the following manner. When the input voltage $V_{IN}$ aids the forward bias, the output current through transistor 4 increases. The increase output current causes the bottom side of resistor 7 to become more negative with respect to ground, and the top side of resistor 8 to become more positive with respect to ground. When the input voltage opposes the forward bias, the output currrent decreases and causes voltage polarities across resistors 7 and 8 opposite to those indicated. This action produces two output voltages that are 180° out of phase with respect to each other. The voltages developed across resistors 7 and 8 are fed, respectively, to filter networks 2 and 3.

As explained hereinbefore, the time constants of R-C networks 2 and 3 are selected so that for a given frequency the output voltage of networks 2 and 3 will be 180° out of phase with respect to the same input signal. Since the input voltage to R-C network 2 is 180° out of phase with respect to the input voltage to network 3, the voltage outputs of 2 and 3 are in phase for a given frequency $f_1$.

The values of resistors 7 and 8 are selected to make the output voltages of R-C networks 2 and 3 equal in magnitude at the desired frequency $f_1$. The voltage outputs of R-C networks 2 and 3 are vectorially added in summing amplifier 9.

We claim:

1. A bandpass amplifier comprising:

(a) means for splitting an input voltage into two equal components, one in phase with and one in phase opposition to said input voltage, (b) means for applying one of said equal components to a passive low pass resistor-capacitor network and the other of said equal components to a passive high pass resistor-capacitor network to produce two waveforms that are in phase with each other at a selected frequency as determined by the resistor-capacitor time constant of said resistor-capacitor networks, and (c) means for vectorially adding said two waveforms to provide an output bandpass waveform that peaks at said selected frequency.

2. The bandpass amplifier of claim 1, wherein said means for splitting said input voltage into two equal components is a transistor amplifier consisting of:

(a) means for applying said input voltage across the base-emitter junction, (b) a first and second resistor connected, respectively, to the emitter and collector electrodes of said transistor, and (c) said low pass resistor-capacitor network connected to said first resistor and said high pass resistor capacitor network connected to said second resistor.

References Cited

UNITED STATES PATENTS

| | | | |
|---|---|---|---|
| 2,599,271 | 6/1952 | Michez | 179—171 |
| 3,193,777 | 7/1965 | Carter et al. | 331—172 X |
| 3,296,464 | 1/1967 | Brault | 330—31 X |

ROY LAKE, *Primary Examiner.*

JAMES B. MULLINS, Jr., *Assistant Examiner.*

U.S. Cl. X.R.

330—31, 124